J. BJORNSEN.
CEREAL DISH.
APPLICATION FILED NOV. 1, 1920.
1,379,519.
Patented May 24, 1921.
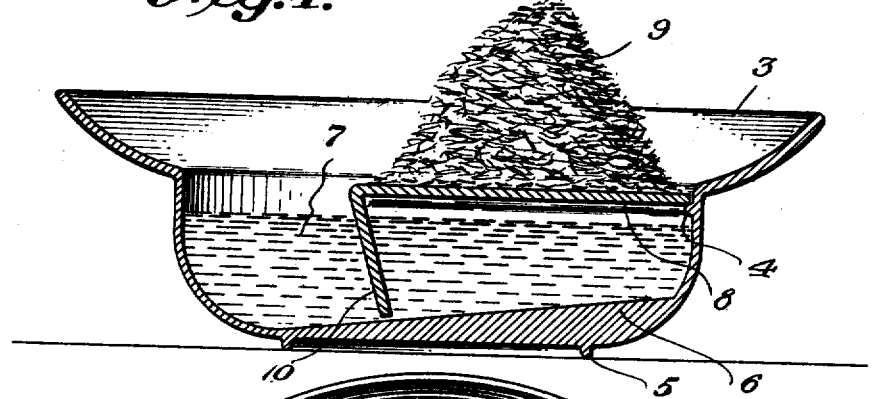
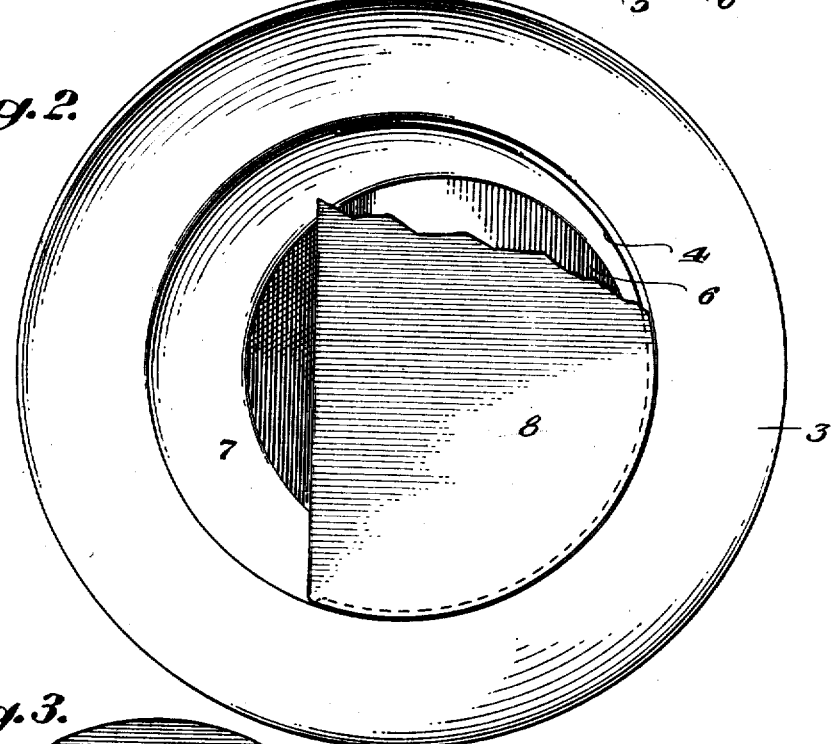
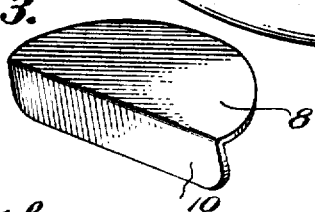
John Bjornsen
INVENTOR
BY Victor J. Evans
ATTORNEY

UNITED STATES PATENT OFFICE.

JOHN BJORNSEN, OF PHILADELPHIA, PENNSYLVANIA.

CEREAL-DISH.

1,379,519.  Specification of Letters Patent.  Patented May 24, 1921.

Application filed November 1, 1920. Serial No. 421,072.

*To all whom it may concern:*

Be it known that I, JOHN BJORNSEN, a citizen of the United States, residing at Philadelphia, in the county of Philadelphia and State of Pennsylvania, have invented new and useful Improvements in Cereal-Dishes, of which the following is a specification.

The object of my present invention is the provision of a dish calculated to promote the convenient eating of cereals in the respect that it prevents the objectionable soaking of the cereal in milk; the dish being designed to contain cereal and milk at one and the same time.

To the attainment of the foregoing, the invention consists in the improvement as hereinafter described and definitely claimed.

In the accompanying drawings, forming part hereof:—

Figure 1 is a diametrical section showing my novel dish as containing a cereal and milk.

Fig. 2 is a plan view of the dish with the cereal support partly broken away.

Fig. 3 is a reduced perspective of the cereal support *per se*.

Similar numerals of reference designate corresponding parts in all of the views of the drawings.

My novel dish comprises a body 1 and a cereal support 2, the cereal support in the present and preferred embodiment of my invention being separable from the body 1 so that the dish as a whole may be readily and thoroughly cleaned.

The body 1 is shown as provided with a flange 3 which is the preferred arrangement for obvious reasons, and at the inner side of the side wall of the body is provided an integral ledge 4 that describes a part and preferably the major part of a circle. At its bottom the body 1 is preferably, though not necessarily, flanged as indicated by 5, and it will also be noted by reference to Fig. 1, that the upper side of the bottom body is inclined downwardly and rearwardly as indicated by 6, this with a view to causing the milk, indicated by 7, to tend to move toward the part of the body that is adjacent to the person who is eating.

The cereal support 2 is formed in one piece and includes a horizontal portion 8 on which cereal, indicated by 9, is designed to be superimposed, Fig. 1, and skirt 10 that extends downwardly and preferably at an acute angle to the horizontal portion 8. The horizontal portion 8 corresponds in outline to the interior of the body 1 so as to rest on and be supported by the ledge 4 and so as to maintain the lower edge of the skirt 10 in slightly spaced relation to the bottom body. This latter feature is desirable inasmuch as it permits free passage of milk toward the portion of the body adjacent to the eater and at the same time prevents cereal from drifting under the support 2. The acute inclination of the skirt 10 is manifestly advantageous inasmuch as it contributes to the capacity of the milk holding portion of the body at the rear of the support 2. It will also be noticed in this connection that the inclination 6 of the body bottom tends to cause the milk to pass to the said portion of the body.

In the practical use of the dish characterized as described it will be apparent that the eater is enabled to maintain the cereal in a crisp state, and to consume the cereal and milk with convenience; also, that when desired the eater can conveniently take a spoon full of cereal and as conveniently dip the same in the milk precedent to passing the spoon to the mouth.

Having described my invention, what I claim and desire to secure by Letters-Patent, is:—

1. A cereal dish comprising a body having the upper side of its bottom inclined and also having at the inner side of its side wall a ledge, and a cereal support, of less area than the interior of the body, superimposed on the said ledge and having on one edge a skirt that is inclined at an acute angle to the major portion of the support and has its lower edge spaced from the body bottom.

2. A cereal dish comprising a body and a cereal support in the body and spaced from the body thereof; said cereal support having a skirt on one edge the lower edge of which skirt is spaced from the body bottom.

3. A cereal dish comprising a body having an outwardly and upwardly reaching marginal flange and also having a body the upper side of which is inclined and further having at the inner side of its side wall a ledge, and a cereal support removably arranged in the body and on said ledge; said support being of less area than the interior of the body and being provided on one edge with a skirt the lower edge of which is slightly spaced from the bottom body.

4. A cereal dish comprising a body having at the inner side of its side wall a ledge, and a cereal support arranged in the body and on said ledge; said support being of less area than the body and being provided on one edge with a skirt the lower edge of which is slightly spaced from the bottom of the body.

In testimony whereof I affix my signature.

JOHN BJORNSEN.